United States Patent
Kamide et al.

(10) Patent No.: US 12,514,235 B2
(45) Date of Patent: Jan. 6, 2026

(54) SEX DETERMINATION DEVICE AND SEX DETERMINATION METHOD

(71) Applicants: Hitachi Solutions Create, Ltd., Tokyo (JP); National Agriculture and Food Research Organization, Tsukuba (JP)

(72) Inventors: Masaharu Kamide, Tokyo (JP); Osamu Shiba, Tokyo (JP); Keiko Ozawa, Tokyo (JP); Takeshi Nakaya, Tokyo (JP); Takahiro Tagami, Tsukuba (JP)

(73) Assignees: HITACHI SOLUTIONS CREATE, LTD., Tokyo (JP); NATIONAL AGRICULTURE AND FOOD RESEARCH ORGANIZATION, Ibaraki (JP)

( * ) Notice: Subject to any disclaimer, the term of this patent is extended or adjusted under 35 U.S.C. 154(b) by 0 days.

(21) Appl. No.: 18/687,548

(22) PCT Filed: Oct. 27, 2022

(86) PCT No.: PCT/JP2022/040223
§ 371 (c)(1),
(2) Date: Feb. 28, 2024

(87) PCT Pub. No.: WO2023/181478
PCT Pub. Date: Sep. 28, 2023

(65) Prior Publication Data
US 2025/0134074 A1    May 1, 2025

(30) Foreign Application Priority Data

Mar. 24, 2022   (JP) ................................. 2022-048231

(51) Int. Cl.
*A01K 45/00*    (2006.01)
*G01N 33/08*    (2006.01)
(Continued)

(52) U.S. Cl.
CPC ........... *A01K 45/007* (2013.01); *G01N 33/08* (2013.01); *G06V 10/143* (2022.01); *G06V 40/00* (2022.01); *H04N 23/11* (2023.01); *H04N 23/56* (2023.01)

(58) Field of Classification Search
CPC .... A01K 45/007; G06V 40/00; G06V 10/143; H04N 23/56; H04N 23/11; G01N 33/08
(Continued)

(56) References Cited

U.S. PATENT DOCUMENTS

| | | | |
|---|---|---|---|
| 9,435,732 B2 | 9/2016 | Rozenboim et al. | |
| 10,705,066 B2 | 7/2020 | Green | |

(Continued)

FOREIGN PATENT DOCUMENTS

| | | |
|---|---|---|
| CN | 108986055 A | 12/2018 |
| JP | 2019-523019 A | 8/2019 |

(Continued)

OTHER PUBLICATIONS

Zhu et al. (Nondestructive identification for gender of chicken eggs based on GA-BPNN with double hidden layers) (Included in IDS), Dec. 2021.*

(Continued)

*Primary Examiner* — James T Boylan
(74) *Attorney, Agent, or Firm* — Volpe Koenig

(57) ABSTRACT

A sexing apparatus 100 includes irradiation means for irradiating each of hen eggs within a predetermined period of time from start of incubation with light having a predetermined wavelength, imaging means for imaging each of the irradiated hen eggs, means for generating a sexing model using, as training data, a result of separately sexing the hen eggs and image data obtained by the imaging of the hen eggs, and means for sexing a new target hen egg by inputting an image data obtained for the target hen egg by the (Continued)

irradiation means and the imaging means into the sexing model.

16 Claims, 12 Drawing Sheets

(51) Int. Cl.
    *G06V 10/143* (2022.01)
    *G06V 40/00* (2022.01)
    *H04N 23/11* (2023.01)
    *H04N 23/56* (2023.01)
(58) Field of Classification Search
    USPC .......................................................... 348/135
    See application file for complete search history.

(56) References Cited

U.S. PATENT DOCUMENTS

2013/0044210 A1* 2/2013 Rozenboim ............ G01N 21/31
                                                          356/53
2020/0400640 A1* 12/2020 Preusse .................. G06V 10/26
2025/0137924 A1   5/2025 Kamide et al.

FOREIGN PATENT DOCUMENTS

| JP | 67-23597 B2 | 7/2020 |
| JP | 2020-521494 A | 7/2020 |
| JP | 2023-141756 A | 10/2023 |
| WO | 2018/023105 A1 | 2/2018 |
| WO | 2018/218299 A1 | 12/2018 |

OTHER PUBLICATIONS

International Search Report for PCT/JP2022/040223, Nov. 29, 2022, 3 pgs.

Z. H. Zhu, et al., "Nondestructive identification for gender of chicken eggs based on GA-BPNN with double hidden layers", Journal of Applied Poultry Research, vol. 30, Issue 4, Dec. 2021, 2022 Poultry Science Association, Elsevier Inc.

Japanese Office Action issued on Apr. 8, 2025 for Japanese Patent Application No. 2022-048231.

* cited by examiner

TRAINING DATA DB ~1013

| SEQUENTIAL NUMBER | INCUBATION START DATE | NUMBER OF DAYS FROM INCUBATION | EGG TYPE | FILE NAME | LIGHT INTENSITY | TEMPERATURE | HUMIDITY | SEXING RESULT |
|---|---|---|---|---|---|---|---|---|
| 1 | yyyy/mm/dd / CAMERA x | LIGHT SOURCE x | n.00 | WHITE (xxx) | n00 | xxxx.jpg | nn.0 | nn.0 | FEMALE |
| 2 | yyyy/mm/dd / CAMERA x | LIGHT SOURCE x | n.00 | WHITE (xxx) | n00 | xxxx.jpg | nn.0 | nn.0 | MALE |
| 3 | yyyy/mm/dd / CAMERA x | LIGHT SOURCE x | n.00 | WHITE (xxx) | n00 | xxxx.jpg | nn.0 | nn.0 | FEMALE |
| 4 | ... | | | | | | | ... |

FIG. 4

THRESHOLD PARAMETER ~1015

| SEQUENTIAL NUMBER | IMAGING/DATA COLLECTION METHOD | DAY | FEMALE DETERMINATION THRESHOLD VALUE | WEIGHT |
|---|---|---|---|---|
| 1 | VISIBLE LIGHT CAMERA 1 | 3.00 DAY | 90% | 100 |
| 2 | VISIBLE LIGHT CAMERA 2 | 3.00 DAY | 90% | 100 |
| 3 | VISIBLE LIGHT CAMERA 1 | 4.00 DAY | 90% | 100 |
| 4 | VISIBLE LIGHT CAMERA 2 | 4.00 DAY | 90% | 100 |
| 5 | VISIBLE LIGHT CAMERA 1 | 5.00 DAY | 90% | 100 |
| 6 | VISIBLE LIGHT CAMERA 2 | 5.00 DAY | | |
| ... | ... | | | |
| n | | | | |

FIG. 5

DETERMINATION METHOD SETTING PARAMETER ~1016

| SEQUENTIAL NUMBER | SETTING VALUE | DEFAULT VALUE |
|---|---|---|
| 1 | COMPREHENSIVE DETERMINATION (WEIGHTED DETERMINATION) | INSTANTANEOUS DETERMINATION |

FIG. 6

DETERMINATION RESULT DB ~1014

| SEQUANTIAL NUMBER | LOT NUMBER | TARGET HEN EGG (TIER-VERTICAL POSITION-HORIZONTAL POSITION) | IMAGING /DATA COLLECTION METHOD 1 | ... | IMAGING /DATA COLLECTION METHOD n | FINAL DETERMINATION |
|---|---|---|---|---|---|---|
| 1 | lot0001 | 1-1-1 | FEMALE | ... | FEMALE | FEMALE |
| 2 | lot0001 | 1-1-2 | FEMALE | ... | FEMALE | FEMALE |
| 3 | lot0001 | 1-1-3 | MALE | ... | MALE | MALE |
| 4 | lot0001 | 1-2-1 | FEMALE | ... | FEMALE | FEMALE |
| ... | ... | ... | ... | ... | ... | ... |

FIG. 7

SEX DETERMINATION DEVICE AND SEX DETERMINATION METHOD

TECHNICAL FIELD

The present invention relates to a sexing apparatus and a sexing method.

BACKGROUND ART

Chickens are subjected to sexing after hatching (on the 21st day from the hatching) by feather sexing. The chickens determined as male are usually culled. In recent years, it has been estimated that 100 million male chicks are culled in Japan every year, and 6 billion worldwide. Culling male chicks after hatching is a serious issue from the viewpoint of animal welfare. As a method of performing sexing before hatching, a method has been known in which a hole measuring 0.3 mm or less is formed on an eggshell of an egg on approximately the ninth day from incubation by applying a laser beam, the allantoic fluid is collected from the hole, and the estrone sulfate in the allantoic fluid is detected by colorimetry to determine the sex.

For example, PTL 1 discloses a technique as a method of determining a state of an egg including the steps of: applying multiple light pulses having a wavelength in the range of 400 to 1500 nm, a width in the range of approximately 0.5 to approximately 500 picoseconds, and an intensity in the range of approximately 0.1 to approximately 100 mJ; detecting reflected light of at least part of the multiple light pulses; and analyzing the detected reflected light to classify the egg into at least one sex.

Furthermore, PTL 2 discloses a technique as a non-invasive method of detecting a present state of a hen egg including the steps of: obtaining an image for test measurement with a hyperspectral camera by measuring an amount of light having at least one predetermined wavelength corresponding to reflected light or transmitted light from the hen egg; comparing the image for test measurement to an image for reference measurement; obtaining, with the hyperspectral camera, at least one spectrum of the hen egg in a predetermined wavelength range; comparing the spectrum using a neural network algorithm; and assessing the present condition of the state of the hen egg using the result of the comparison.

Moreover, PTL 3 discloses a non-destructive hatching egg inspection apparatus including: a light irradiation unit that irradiates a hatching egg with light; a light detection unit that detects the intensity of light transmitted through the hatching egg; and a sexing unit that performs pre-sexing based on the intensity of the light transmitted through the hatching egg at a first time point at which a predetermined period of time elapses from the start of incubation.

CITATION LIST

Patent Literatures

[PTL 1] Specification of U.S. Pat. No. 10,705,066
[PTL 2] Specification of U.S. Pat. No. 9,435,732
[PTL 3] Japanese Patent No. 6723597

SUMMARY OF INVENTION

Technical Problem

As described above, methods 4 sexing hen eggs before hatching have been known. However, there are some problems in the conventional sexing methods. For example, in the method of sexing performed by forming a hole on the eggshell to collect the allantoic fluid, the formation of the hole and/or the collection of the allantoic fluid may lower the hatching rate of the hen eggs. The techniques disclosed in PTLs 1 to 3 can perform sexing by non-destructive spectrographic means. However, the method disclosed in PTL 1 requires applying light pulses over a wide wavelength range from a visible light to a near-infrared light, and detecting the reflected light. Accordingly, it may take a long time to implement the method. In addition, the method disclosed in PTL 2 requires special means such as measurement with a hyperspectral camera and a process with a neutral network algorithm. Accordingly, the costs required to introduce and implement the method may be excessively high.

Furthermore, with any of the non-destructive methods, it is difficult to perform highly precise sexing before the seventh day of incubation. In the case of chickens, the embryo is assumed to acquire a sense of pain on or after the seventh day of incubation. Thus, employing the non-destructive conventional techniques will not solve animal welfare problems after all. In other words, a method of performing sexing at an early stage of incubation has not been established yet.

Thus, an object of the present invention is to provide a technique that makes it possible to perform highly precise non-destructive sexing at an early stage of incubation.

Solution to Problem

A sexing apparatus in the present embodiment for solving the above problems comprises irradiation means for irradiating each of hen eggs within a predetermined period of time from start of incubation with light having a predetermined wavelength, imaging means for imaging each of the irradiated hen eggs, means for generating a sexing model using, as training data, a result of separately sexing the hen eggs and image data obtained by the imaging of the hen eggs, and means for sexing a new target hen egg by inputting an image data obtained for the target hen egg by the irradiation means and the imaging means into the sexing model. Furthermore, a sexing method in the present embodiment comprises an irradiation step of irradiating each of the hen eggs within a predetermined period of time from start of incubation with light having a predetermined wavelength, an imaging step of imaging each of the irradiated hen eggs, a step of generating a sexing model using, as training data, a result of separately sexing the hen eggs and image data obtained by the imaging of the hen eggs, and a step of sexing a new target hen egg by inputting an image data obtained for the target hen egg by the irradiation means and the imaging means into the sexing model.

Advantageous Effect of Invention

In accordance with the present invention, it is possible to perform highly precise non-destructive sexing at an early stage of incubation.

BRIEF DESCRIPTION OF DRAWINGS

FIG. 4 is a diagram illustrating an example configuration of a training data DB in the present embodiment.

FIG. 5 is a diagram illustrating an example configuration of a threshold parameter in the present embodiment.

FIG. 6 is a diagram illustrating an example configuration of a determination method setting parameter in the present embodiment.

FIG. 7 is a diagram illustrating an example configuration of a determination result DB in the present embodiment.

DESCRIPTION OF EMBODIMENTS

Example Configuration of Sexing System

Figure 1:
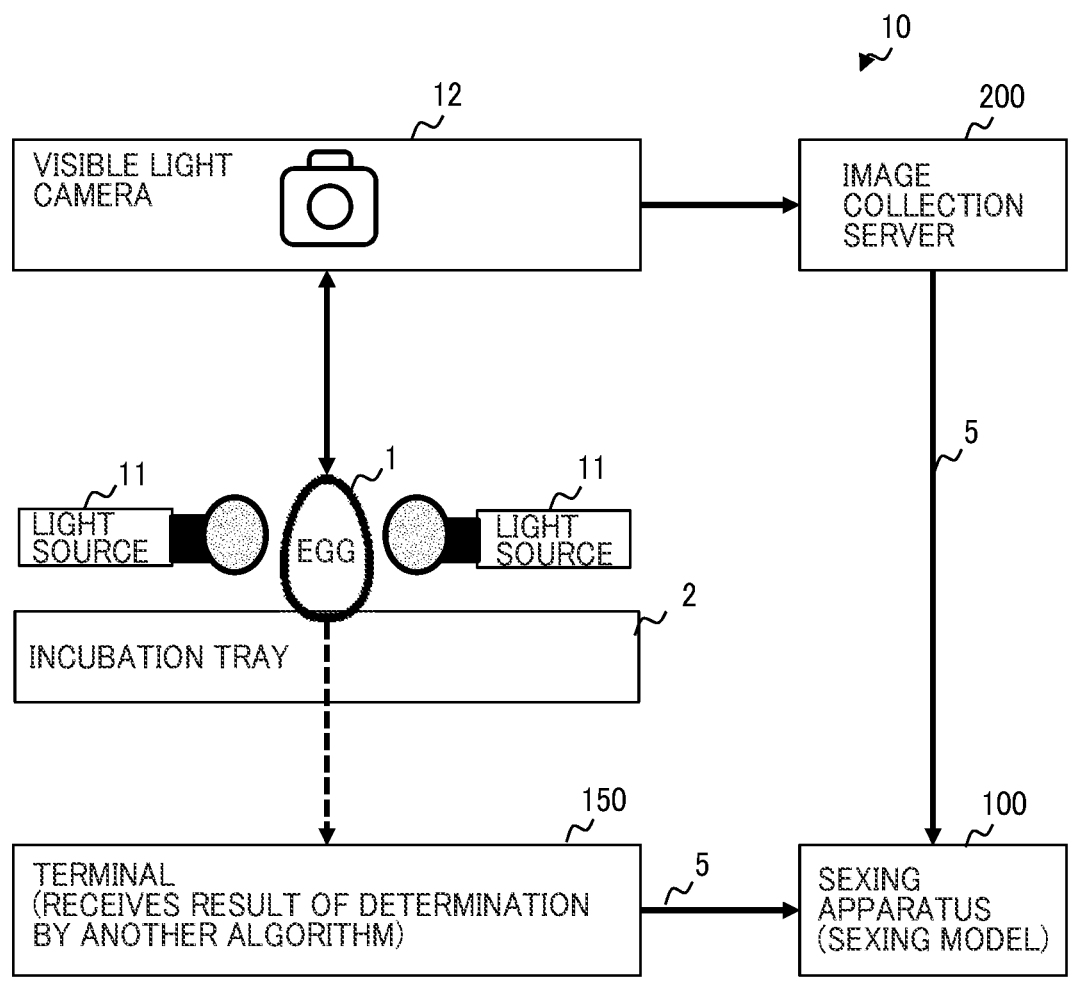
FIG. 1 is a diagram illustrating an example configuration of a sexing system in an embodiment.

An embodiment of the present invention will be described in detail below with the drawings. FIG. 1 is a diagram illustrating an example configuration of a sexing system 10 including a sexing apparatus 100 in the present embodiment. Besides the sexing apparatus 100, the sexing system 10 illustrated in FIG. 1 includes an incubation tray 2 on which to place a hen egg 1 and perform an incubation process, light sources 11, a visible light camera 12, light sources 11, a terminal 150, and an image collection server 200.

The sexing system 10 with such a configuration, or the sexing apparatus 100, can perform highly precise non-destructive sexing at an early stage of incubation.

In a system configuration as illustrated in FIG. 1, the hen egg 1 is a target hen egg to be sexed. This hen egg 1 is placed on the incubation tray 2 of an incubator and handled under appropriate conditions. The hen egg 1 placed on the incubation tray 2 is irradiated with light with an appropriate wavelength from the light sources 11.

The light sources 11 are, for example, light emitting units including LED (light emitting diode) elements. Light emitted by these light sources 11 is visible light (light which the imaging element of the visible light camera 12 can capture), and is assumed to be light having a wavelength of around 520 nm, for example. Note that such a wavelength is an example, and the light is not limited as long as the visible light camera 12 can capture.

Incidentally, another possible example of the light sources 11 is a light application element selected from the group consisting of a halogen lamp and an EverGlo ceramic.

On the other hand, the reflected light of the light from the light sources 11 generated on the hen egg 1 is captured by the imaging element of the visible light camera 12. In other words, the visible light camera 12 images the hen egg 1. A CCD (Charge Coupled Device) or a CMOS (Complementary Metal Oxide Semiconductor), for example, may be employed as the imaging element, but the imaging element is not limited to these.

It is to be noted that the above-mentioned target hen egg 1 in the sexing system 10 in the present embodiment is sexed within 6 days from the start of the incubation. From the viewpoint of animal welfare, it is very meaningful to perform sexing before the seventh day from the start of the incubation, on which the embryo in the hen egg 1 is assumed to acquire a sense of pain, that is, before the hen egg 1 (a concept including the embryo growing inside the hen egg 1 and the resulting chick) becomes able to feel pain.

Incidentally, the sexing apparatus 100 in the present embodiment is communicatively coupled to the terminal 150 and the image collection server 200 through a network 5, as illustrated in FIG. 1. Thus, these may be collectively referred to as the sexing system 10.

The sexing apparatus 100 in the present embodiment can be seen as an apparatus providing a service that performs sexing of the hen egg 1 placed on the incubation tray 2, by obtaining information appropriately from apparatuses that configure the sexing system 10 as described above.

The terminal 150, on the other hand, is an apparatus or a terminal belonging to a person in charge which performs highly precise sexing with an algorithm different from that of the sexing apparatus 100 in the present embodiment. Specifically, the terminal 150 can be assumed to be a personal computer, a smartphone, a tablet terminal, or the like. This algorithm that performs the highly precise sexing will be described later.

Moreover, the image collection server 200 is a server that obtains image data of the hen egg 1 from the visible light camera 12 (or its control system or the like), and the image collection server 200 also stores and manages the image data in association with attribute information such as the imaging conditions of the visible light camera 12 and the like.

Whenever this image collection server 200 obtains image data from the visible light camera 12, the image collection server 200 immediately transmits the obtained image data to the sexing apparatus 100 through the network 5, or each time the image collection server 200 obtains and stores image data in a predetermined period of time, the image collection server 200 transmits the obtained image data to the sexing apparatus 100.

Hardware Configuration: Sexing Apparatus

Figure 2:
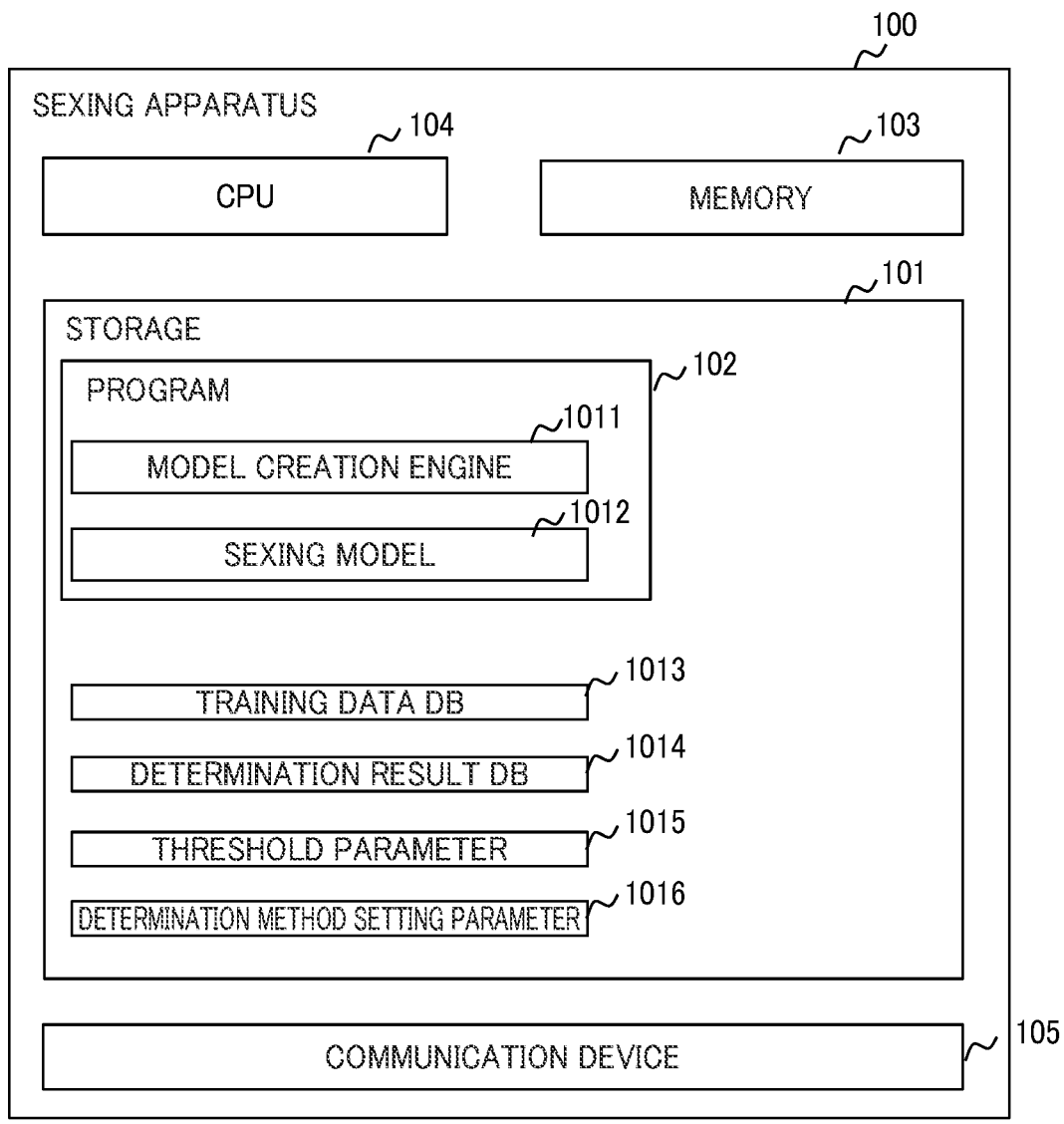
FIG. 2 is a diagram illustrating an example configuration of a sexing apparatus in the present embodiment.

The sexing apparatus 100 included in the sexing system 10 in the present embodiment has the following hardware configuration as illustrated in FIG. 2.

Specifically, the sexing apparatus 100 includes a storage 101, a memory 103, a CPU 104, and a communication device 105. The sexing apparatus 100 may further include the light sources 11 and the visible light camera 12, described above.

Of these, the storage 101 is a suitable non-volatile storage device, such as an SSD (Solid State Drive) or a hard disk drive.

The memory 103 is a volatile storage device, such as a RAM.

The CPU 104 is a CPU that executes, for example, load of a program 102 held in the storage 101 into the memory 103 for comprehensively controlling the apparatus, and also performs various determination, computation, and control processes.

The communication device 105 is assumed to be a network interface card or the like that couples to the network 5 and performs communication processes with the terminal 150 and the image collection server 200.

Note that when the sexing apparatus 100 is a standalone machine, it is preferable to further include an input device that receives key inputs and audio inputs from a user, and an output device such as a display that displays processed data.

The storage 101 stores at least a training data DB 1013, a determination result DB 1014, a threshold parameter 1015, and a determination method setting parameter 1016 in addition to the program 102, which is for implementing necessary functions as the sexing apparatus 100 in the present embodiment. Note that details of these databases and parameters will be described later.

The program 102 includes a model creation engine 1011 and a sexing model 1012. As will be described in detail later, the model creation engine 1011 is an engine that executes machine learning with imaging data on a large number of hen eggs (image data and its conditions) and labels of the imaged hen eggs (sexing results) as training data, and generates the sexing model 1012 to sex the hen egg 1. The sexing model 1012 is also a model created by the above model creation engine 1011.

Hardware Configuration: Image Collection Server

Figure 3:
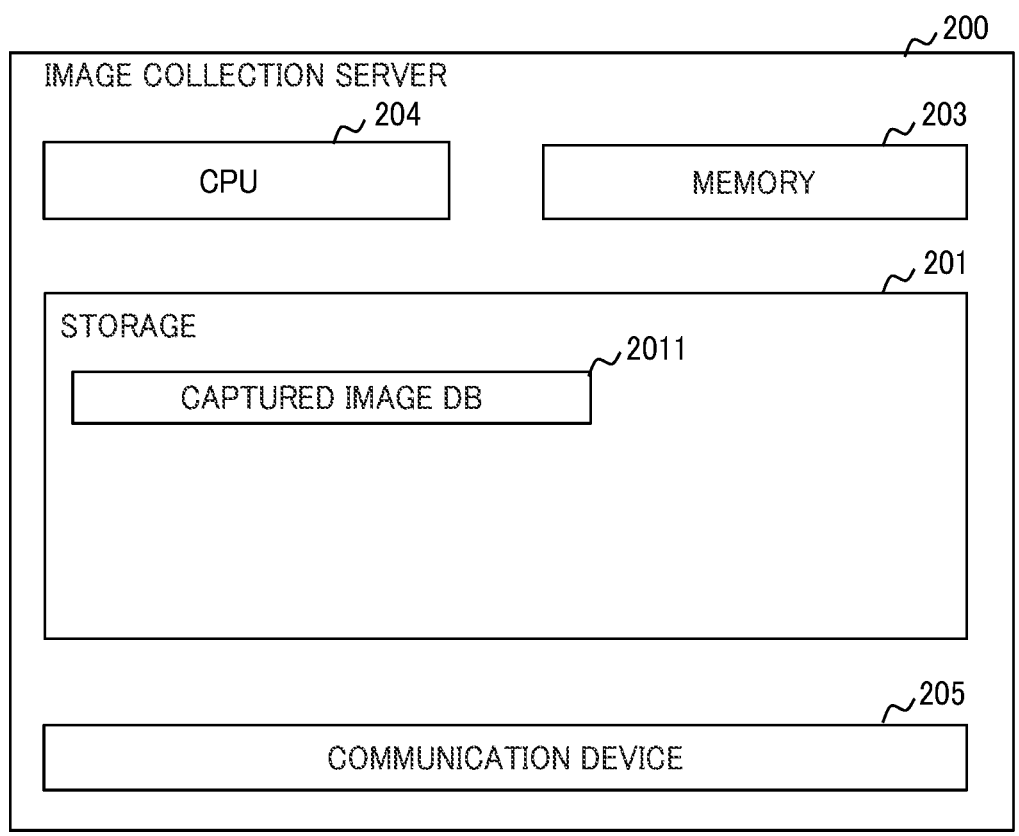
FIG. 3 is a diagram illustrating an example configuration of an image collection server in the present embodiment.

The image collection server 200 in the present embodiment has the following hardware configuration as illustrated in FIG. 3. Specifically, the image collection server 200 includes a storage 201, a memory 203, a CPU 204, and a communication device 205.

Of these, the storage 201 is a suitable non-volatile storage device, such as an SSD (Solid State Drive) or a hard disk drive.

The memory 203 is a volatile storage device, such as a RAM.

The CPU 204 is a CPU that executes, for example, load of a program 202 held in the storage 201 into the memory 203 for comprehensively controlling the apparatus, and also performs various determination, computation, and control processes.

The communication device 205 is assumed to be a network interface card or the like that couples to the network 5 and performs a communication process with the sexing apparatus 100.

The storage 201 stores at least a captured image DB 2011 in addition to the program 202 for implementing functions necessary for the image collection server 200 in the present embodiment. Note that details of this captured image DB 2011 will be described later.

Example Data Structures

Next, various pieces of information handled by the sexing apparatus 100 in the present embodiment will be described. FIG. 4 illustrates an example of the training data DB 1013 in the present embodiment.

The training data DB 1013 in the present embodiment associates image data transmitted from the image collection server 200 with sexing results (obtained from the terminal 150) regarding hen eggs that are subjected to the image data, and the training data DB 1013 also stores and manages training data, i.e. training data for the model creation engine 1011, for machine learning.

This training data DB 1013 is a collection of records and associates, for example, sequential numbers as key information with pieces of data such as the incubation start date, number of days from incubation, egg type, file name, camera, light source, light intensity, temperature, and humidity.

Of these, the number of days from incubation is the number of days passed since the incubation start date. The egg type indicates whether an eggshell of the target hen egg is white or red. The file name indicates a name (or storage destination) of the image data obtained by imaging the hen egg with the visible light camera.

The camera indicates identification information of the camera that is disposed around the incubation tray 2 of the incubator, and that images the hen egg on the incubation tray 2.

The light source indicates identification information of the light sources used in the imaging of the hen egg on the incubation tray 2. The light intensity indicates the intensity of the light applied by the above light sources. The temperature indicates the temperature around the incubation tray 2 during the imaging, and the humidity indicates the humidity in the same space.

The sexing result indicates the result of highly precise sexing input by an operator of the terminal 150 or the like. Details of this sexing will be described later.

FIG. 5 illustrates an example of the threshold parameter 1015 in the present embodiment. The threshold parameter 1015 in the present embodiment designates multiple patterns each representing an imaging method and a date for imaging for the hen egg 1, and is a set of values specifying a determination threshold value and a weight for each of those patterns.

Such a threshold parameter 1015 includes values being an imaging/data collection method, a day, a female determination threshold value, and a weight. Of these, the imaging/data collection method indicates the type of the visible light camera. The day is a value designating the day from the start of the incubation on which to perform imaging.

The female determination threshold value is a threshold to determine that the hen egg is female when a certainty factor of the sexing model 1012 is equal to or more than the female determination threshold value. The weight is a value of weighted determination (the unit is %) as a result of a comprehensive determination that will be described later.

The above female determination threshold value is changeable. Using such a female determination threshold value makes it possible for the system to contribute to animal welfare and bring about economic advantages at the same time. For example, setting the female determination threshold value to a level lower than a certain standard can satisfy the need to determine the sex of hen eggs 1 fixedly as soon as possible, even if there is a possibility that the hen eggs 1 determined as female, at least to some extent, include hen eggs determined to be male.

Alternatively, setting the female determination threshold value to a level higher than a certain standard can satisfy the need to minimize the possibility that the hen eggs 1 determined as female include hen eggs determined to be male, despite the possibility of requiring a certain number of days (at most 6 days from the start of the incubation).

In addition, for example, the value of the weight may be used such that the value of the weight for the sexing results in a period at an early stage after the start of the incubation (e.g., up to the third day) is set lower than the value of the weight for the subsequent period (e.g., the fourth to sixth day). In this way, it is possible to perform sexing focusing more on accuracy.

FIG. 6 illustrates an example of the determination method setting parameter 1016 in the present embodiment. The determination method setting parameter 1016 in the present embodiment is a set of values specifying a sexing algorithm to be executed by the sexing apparatus 100.

This determination method setting parameter 1016 includes a sequential number, a setting value, and a default value. Of these, the setting value indicates an algorithm to be used in sexing designated by a user. In the example of the figure, a value of "comprehensive determination (weighted determination)" is set. This algorithm performs sexing based on the sexing results and the values of "weight" in the threshold parameter 1015 on all of the days designated for imaging.

Other possible algorithms include an instantaneous determination algorithm (which determines a hen egg as a male hen egg on any day for imaging if the hen egg is determined as male), and a comprehensive determination (majority decision) algorithm. The comprehensive determination (majority decision) algorithm fixedly determines the sex of the hen egg by making a majority decision based on the sexing results on all of the days designated for imaging, for example.

FIG. 7 illustrates an example configuration the determination result DB 1014 in the present embodiment. This determination result DB 1014 is a database storing the results of sexing of hen eggs 1 by the sexing model 1012 of the sexing apparatus 100 in the present embodiment.

This determination result DB 1014 includes records each including values being a sequential number, a lot number, a target hen egg, an imaging/data collection method 1, . . . , an imaging/data collection method n, and a final determination.

Of these, the lot number is identification information of a lot to which the target hen egg belongs. The target hen egg is a value indicating a position on the incubation tray 2 of the incubator. For example, it indicates a tier number of the incubation tray 2 and coordinates on the tier of the incubation tray 2 at which the hen egg 1 is placed (a concept similar to coordinate values in a coordinate space).

The value in each column of imaging/data collection method is a value indicating the result of sexing performed by the sexing model 1012 on image data obtained by imaging under the condition corresponding to the value in each column of imaging/data collection method in the threshold parameter 1015 in FIG. 5.

The value in a column of the final determination is a value indicating the result of final determination performed by a sexing algorithm such as the instantaneous determination algorithm or the comprehensive determination algorithm.

Example Flow: Model Creation

An actual procedure in a sexing method in the present embodiment will be described below based on drawings. A program loaded into a memory and executed by the sexing apparatus 100 implements the various operations in response to the sexing method as described below. Moreover, this program is made of code for performing the various operations to be described below.

Figure 8A:
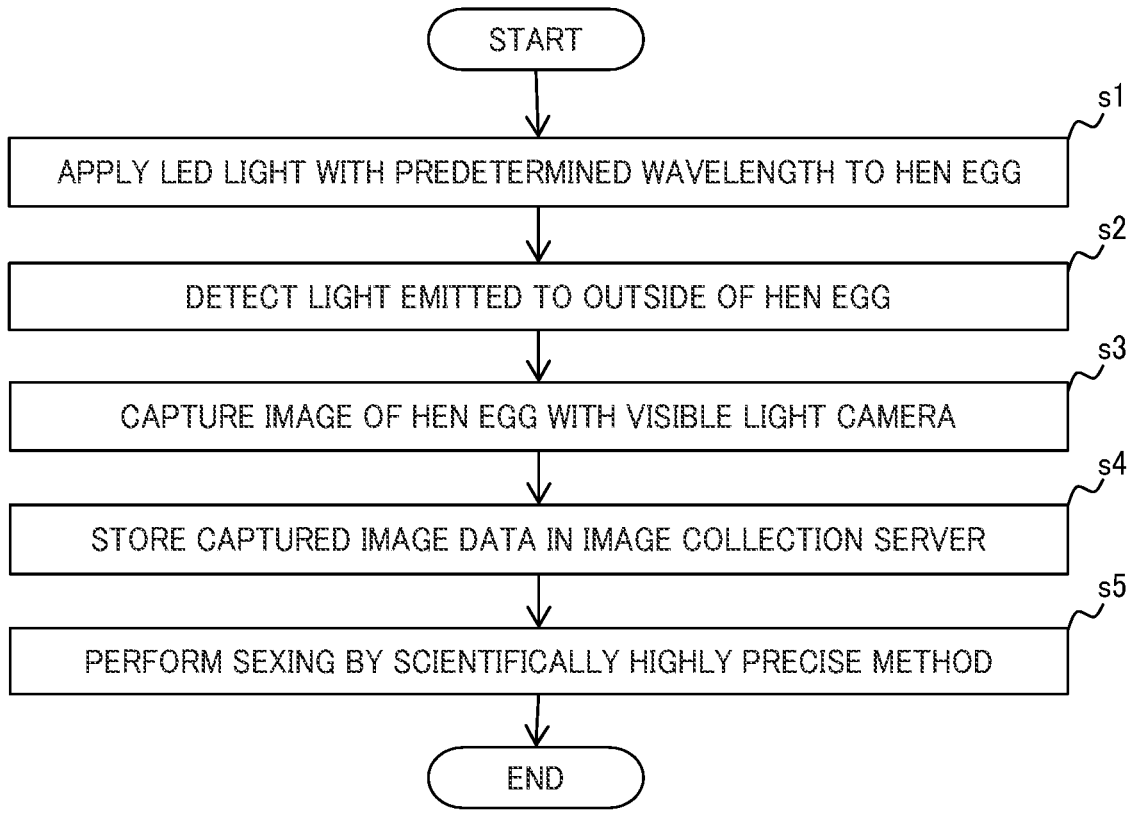
FIG. 8A is a diagram illustrating an example flow of a sexing method in the present embodiment.

FIG. 8A is a diagram illustrating an example flow of the sexing method in the present embodiment. In the following, a flow of generation of the sexing model 1012 will be described first.

In this case, the sexing apparatus 100, for example, controls the light sources 11 to apply light with a predetermined wavelength to each hen egg on the incubation tray 2 (s1). The wavelength of this light is as already described earlier.

Subsequently, the sexing apparatus 100 detects the light applied from the light sources 11 which is subsequently transmitted through the hen egg, or reflected inside the hen egg and emitted to the outside of the hen egg (s2). This detection is implemented with a light detection element, for example. This light detection means includes a light detection element selected from the group consisting of silicon, PbS (lead sulfide), InGaAs (Indium gallium arsenide), and arsenides.

In this detection, also, the sexing apparatus 100 obtains a visible and near-infrared spectra of the detected light with a spectrometer.

The sexing apparatus 100 also controls the visible light camera 12 to image the hen egg mentioned above (s3), and stores the image data in the image collection server 200. Alternatively, the visible light camera 12 stores the image data of the imaged hen egg in the image collection server 200 (s4).

Subsequently, the sexing apparatus 100 sexes the hen egg based on the image data of the hen eggs and the visible and near-infrared spectra, obtained so far (s5). The sexing result in this step is stored in the "SEXING RESULT" column in the training data DB 1013.

In this case, the sexing apparatus 100 sexes the hen egg based on spectrum data of the wavelength range of 1700 to 2500 nm in the visible and near-infrared spectra.

Details of such a sexing method based on the visible and near-infrared spectra include a light irradiation step, a light detection step, a spectrum obtaining step, and a sexing step, as described below.

Of these, the light irradiation step is a step of irradiating the hen egg 1 with light having a wavelength in a visible light and near-infrared light range. Here, "visible light" refers to light having a wavelength in the wavelength range of 400 to 900 of 400 to 750 nm, nm which includes a wavelength range corresponding to visible light. Moreover, "near-infrared light" refers to light having a wavelength in the wavelength range of 900 to 2500 nm.

For example, the "light having a wavelength in a visible light and near-infrared light range" refers to light having a wavelength in the wavelength range of 400 to 2500 nm.

The light applied in this step (hereinafter also referred to as "applied light") preferably has a wavelength in the wavelength range of 400 to 2500 nm, and more preferably, has wavelengths in the wavelength range of 400 to 900 nm and the wavelength range of 1700 to 2500 nm.

The applied light may be light continuously having all wavelengths in the above wavelength range(s) or light having some of the wavelengths in the wavelength range(s) (e.g., particular wavelengths). By applying light having a wavelength in the above wavelength range, it is possible to perform highly precise sexing in the sexing step to be described below. In addition, by selectively applying light having particular wavelengths, e.g., wavelengths in the wavelength range of 400 to 900 nm and the wavelength range of 1700 to 2500 nm, it is possible to narrow the wavelength sweep range and shorten the time required to perform this step.

In this step, the applied light can be applied to the hen egg from various directions. For example, in an embodiment, the applied light is applied to the hen egg placed such that the longitudinal axis linking its blunt end and pointy end perpendicularly crosses a horizontal plane, in any direction from above the hen egg so as to pass through the animal pole or the embryo (e.g., a direction in the range of 0 to 50° to the longitudinal axis, in particular, a direction parallel to the longitudinal axis in a plane parallel to a vertical plane including the longitudinal axis) (hereinafter also referred to as "first embodiment").

In another embodiment, the applied light is applied to the hen egg placed such that the longitudinal axis linking its blunt end and pointy end lies parallel to a horizontal plane, in any direction from a lateral side relative to the hen egg so as to pass through the animal pole or the embryo (e.g., a direction in the range of 0 to 90° to the longitudinal axis, in particular, a direction perpendicular to the longitudinal axis in a plane parallel to a horizontal plane including the longitudinal axis) (hereinafter also referred to as "second or fourth embodiment").

In another embodiment, the applied light is applied to the hen egg placed such that the longitudinal axis linking its blunt end and pointy end lies parallel to a horizontal plane, in any direction from above the hen egg so as to pass through the animal pole or the embryo (e.g., a direction in the range of 40 to 90° to the longitudinal axis, in particular, a direction perpendicular to the longitudinal axis in a plane parallel to a vertical plane including the longitudinal axis) (hereinafter also referred to as "third or sixth embodiment").

In another embodiment, the applied light is applied to the hen egg placed such that the longitudinal axis linking its blunt end and pointy end lies parallel to a horizontal plane, in any direction from below the hen egg so as to pass through the animal pole or the embryo (e.g., a direction in the range of 40 to 90° to the longitudinal axis, in particular, a direction perpendicular to the longitudinal axis in a plane parallel to a vertical plane including the longitudinal axis) (hereinafter also referred to also "fifth embodiment").

In the preferred first embodiment, the applied light is applied to the hen egg placed such that the longitudinal axis linking its blunt end and pointy end perpendicularly crosses a horizontal plane, from above the hen egg in a direction parallel to the longitudinal axis in a plane parallel to a vertical plane including the longitudinal axis so as to pass through the animal pole or the embryo.

In the preferred second or fourth embodiment, the applied light is applied to the hen egg placed such that the longitudinal axis linking its blunt end and pointy end lies parallel to a horizontal plane, from a lateral side relative to the hen egg in a direction perpendicular to the longitudinal axis in a plane parallel to a horizontal plane including the longitudinal axis so as to pass through the animal pole or the embryo.

In the preferred third or sixth embodiment, the applied light is applied to the hen egg placed such that the longitudinal axis linking its blunt end and pointy end lies parallel to a horizontal plane, from above the hen egg in a direction perpendicular to the longitudinal axis in a plane parallel to a vertical plane including the longitudinal axis so as to pass through the animal pole or the embryo.

In the preferred fifth embodiment, the applied light is applied to the hen egg placed such that the longitudinal axis linking its blunt end and pointy end lies parallel to a horizontal plane, from below the hen egg in a direction perpendicular to the longitudinal axis in a plane parallel to a vertical plane including the longitudinal axis so as to pass through the animal pole or the embryo.

In the embodiments exemplarily described above, it is preferable to check the position of the animal pole or the embryo in the hen egg with an egg candler beforehand and place the hen egg such that the applied light will be incident on the animal pole or the embryo. By performing this step such that the applied light passes through the animal pole or the embryo, it is possible to obtain information on the blood and/or various components contained in the animal pole or the embryo in the steps to be described below and perform highly precise sexing.

In the present embodiment, "parallel," "vertical," and "perpendicular" means that the positional relationship between straight lines and/or planes completely or substantially parallel, vertical, and perpendicular, respectively.

Normally, this step is performed with the hen egg 1 fixed so that the hen egg and the applied light can be arranged in any of the positional relationships described above. Thus, in this step, it is preferable to use the incubation tray 2 to arrange the hen egg in any of the above position. In the case of using the incubation tray 2, the hen egg is placed on the upper surface of the incubation tray 2, for example.

In the present embodiment, "so as to pass through the animal pole or the embryo" and "so as to pass through the yolk" mean that the light passes through at least part of the animal pole, the embryo, or the yolk in the hen egg.

Such a position as to pass through the animal pole or the embryo refers to, for example, a range of 15 to 30 mm and typically a range of 17 to 25 mm from the pointy end of the hen egg. Such a position as to pass through the yolk refers to, for example, a range of 20 to 60 mm and typically a range of 27 to 52 mm from the pointy end of the hen egg.

It is preferable to perform this step by applying light inside a housing member housing the hen egg and the incubation tray. The housing member is preferably a member capable of substantially blocking external light, like a camera obscura. Performing this step inside the housing member makes it possible to substantially eliminate the influence of external light and thus perform more accurate sexing.

Incidentally, in the light detection step, the light transmitted through the hen egg 1 and emitted to the outside of the hen egg after being applied in the above light irradiation step may be referred to as "transmitted light," and the light reflected inside the hen egg and emitted to the outside of the hen egg after being applied in the light irradiation step may be referred to as "reflected light."

While it is possible to select between the transmitted light or the reflected light based on the combination of the light application position in the light irradiation step and the light detection position in this step, it is difficult to strictly separate the transmitted light and the reflected light. For this reason, in the present embodiment, the transmitted light may contain the reflected light at a certain ratio, and the reflected light may include the transmitted light at a certain ratio.

In addition, in the present embodiment, an embodiment of sexing performed by detecting the transmitted light that is emitted to the outside of the hen egg may be referred to as "transmission method," and an embodiment of sexing performed by detecting the reflected light that is emitted to the outside of the hen egg may be referred to as "reflection method."

The transmitted light or the reflected light detected in this step preferably has a wavelength in the wavelength range of 400 to 2500 nm, and more preferably, has wavelengths in the wavelength range of 400 to 900 nm and the wavelength range of 1700 to 2500 nm.

The transmitted light or the reflected light may be light continuously wavelengths in the above wavelength range(s) or light having some of the wavelengths in the above wavelength range(s) (e.g., particular wavelengths).

By detecting the transmitted light or the reflected light having a wavelength in the above wavelength range, it is possible to perform highly precise sexing in the sexing step to be described below. Moreover, by selectively detecting the transmitted light or the reflected light, having particular wavelengths, e. g., wavelengths in the wavelength range of 400 to 900 nm and the wavelength range of 1700 to 2500 nm, it is possible to narrow the wavelength sweep range and shorten the time required to perform this step.

In this step, it is possible to detect light emitted in various directions from the hen egg. For example, in an embodiment, the light to be detected is transmitted through by the hen egg placed such that the longitudinal axis linking its blunt end and pointy end perpendicularly crosses a horizontal plane, and emitted to a lateral side relative to the hen egg (transmitted light), and further, the light being emitted in any direction so as to pass through the yolk in the hen egg (e.g., a direction in the range of 40 to 90° to the longitudinal axis, in particular, a direction perpendicular to the longitudinal axis in a horizontal plane perpendicular to the longitudinal axis) (transmitted light) (hereinafter also referred to as "first embodiment").

In another embodiment, the light to be detected is transmitted through the hen egg placed such that the longitudinal axis linking its blunt end and pointy end lies parallel to a horizontal plane, and emitted to below the hen egg (transmitted light), and further, the light being emitted in any direction so as to pass through the yolk in the hen egg (e.g., a direction in the range of 40 to 90° to the longitudinal axis, in particular, a direction perpendicular to the longitudinal axis in a plane parallel to a vertical plane including the longitudinal axis) (transmitted light) (hereinafter also referred to as "second or third embodiment").

In another embodiment, the light to be detected is transmitted through the hen egg placed such that the longitudinal axis linking its blunt end and pointy end lies parallel to a horizontal plane, and emitted to a lateral side relative to the hen egg (transmitted light), and further, the light being emitted in any direction so as to pass through the yolk in the hen egg (e.g., a direction in the range of 0 to 90° to the longitudinal axis, in particular, a direction perpendicular to the longitudinal axis in a plane parallel to a horizontal plane including the longitudinal axis) (hereinafter also referred to as "fourth embodiment").

In another embodiment, the light to be detected is reflected inside the hen egg placed such that the longitudinal axis linking its blunt end and pointy end lies parallel to a horizontal plane, and emitted to below the hen egg (reflected light), and further, the light being emitted in any direction so as to pass through the yolk in the hen egg (e.g., a direction in the range of 40 to 90° to the longitudinal axis, in particular, a direction at 45° to the longitudinal axis in a plane parallel to a vertical plane including the longitudinal axis) (reflected light) (hereinafter also referred to as "fifth embodiment").

In another embodiment, the light to be detected is reflected inside the hen egg placed such that the longitudinal axis linking its blunt end and pointy end lies parallel to a horizontal plane, and emitted to above the hen egg (reflected light), and further, the light being emitted in any direction so as to pass through the yolk in the hen egg (e.g., a direction in the range of 40 to 90° to the longitudinal axis, in particular, a direction perpendicular to the longitudinal axis in a plane parallel to a vertical plane including the longitudinal axis) (reflected light) (hereinafter also referred to as "sixth embodiment").

In the preferred first embodiment, the light to be detected is transmitted through the hen egg placed such that the longitudinal axis its blunt linking end and pointy end perpendicularly crosses a horizontal plane, and the light being emitted to a lateral side relative to the hen egg, and further, the light being emitted in a direction perpendicular to the longitudinal axis in a horizontal plane perpendicular to the longitudinal axis so as to pass through the yolk in the hen egg (transmitted light).

In the preferred second or third embodiment, the light to be detected is transmitted through the hen egg placed such that the longitudinal axis linking its blunt end and pointy end lies parallel to a horizontal plane, and emitted to below the hen egg, and further, the light being emitted in a direction perpendicular to the longitudinal axis in a plane parallel to a vertical plane including the longitudinal axis so as to pass through the yolk in the hen egg (transmitted light).

In the preferred fourth embodiment, the light to be detected is transmitted through the hen egg placed such that the longitudinal axis linking its blunt end and pointy end lies parallel to a horizontal plane, and emitted to a lateral side relative to the hen egg, and further, the light being emitted in a direction perpendicular to the longitudinal axis in a plane parallel to a horizontal plane including the longitudinal axis so as to pass through the yolk in the hen egg (transmitted light).

In the preferred fifth embodiment, the light to be detected is reflected inside the hen egg placed such that the longitudinal axis linking its blunt end and pointy end lies parallel to a horizontal plane, and emitted to below the hen egg, and further, the light being emitted in a direction at 45° to the longitudinal axis in a plane parallel to a vertical plane including the longitudinal axis so as to pass through the yolk in the hen egg (reflected light).

In the preferred sixth embodiment, the light to be detected is reflected inside the hen egg placed such that the longitudinal axis linking its blunt end and pointy end lies parallel to a horizontal plane, and emitted to above the hen egg, and further, the light being emitted in a direction perpendicular to the longitudinal axis in a plane parallel to a vertical plane including the longitudinal axis so as to pass through the yolk in the hen egg (reflected light).

In the embodiments exemplarily described above, it is preferable to check the position of the yolk in the hen egg with an egg candler beforehand and place the hen egg such that the transmitted light or the reflected light will pass through the yolk. By performing this step such that the transmitted light or the reflected light passes through the yolk, it is possible to obtain information on the blood and/or various components contained in the animal pole or the embryo in the steps to be described below and perform highly precise sexing. It is also preferable to perform the above step by detecting the light inside the housing member described above. Performing this step inside the housing member makes it possible to substantially eliminate the influence of external light and thus perform more accurate sexing.

Subsequently, the spectrum obtaining step is a step of obtaining the visible and near-infrared spectra of the light detected in the above light detection step.

This step is performed by generating the visible and near-infrared spectra based on the light detected in the light detection step. The means for generating the visible and near-infrared spectra can be a visible and near-infrared spectrometer generally used in the art.

Usually, a data analysis apparatus storing a spectrum data analysis program is coupled to, as well as a control program for the visible and near-infrared spectra is provided to the visible and the near-infrared spectrometer. Thus, it is possible to quickly generate the visible and near-infrared spectra and analyze the spectrum data, by using the visible spectrometer and the near-infrared spectrometer.

The visible and near-infrared spectra obtained in this step may be the spectra as it is, or a second-order derivative spectrum obtained by second-order differentiation of the spectrum. The second-order derivative spectrum is preferable since it can reduce the influence of a change of a base line and the like. By obtaining the second-order derivative spectrum in this step, it is possible to perform highly precise sexing.

Subsequently, the sexing step is a step of sexing the hen egg 1 based on the spectrum data of the visible and near-infrared spectra obtained in the above spectrum obtaining step.

In this step, for example, a multivariate analysis publicly known in the art can be employed as the means for sexing the hen egg 1 based on the spectrum data. Examples of the multivariate analysis include principal component analysis and partial least square discriminant analysis (PLS-DA).

In the case of using the principal component analysis to perform this step, it may be performed through the following procedure. First, a sexing model is created. Using a predetermined number of hen eggs whose sexes have already been identified, the light irradiation step, the light detection step, and the spectrum obtaining step are performed to obtain a standard visible and near-infrared spectra for males and for females. The visible and near-infrared spectra is preferably a second-order derivative spectrum. The hen eggs to be used to obtain the standard visible and near-infrared spectra may be sexed by sexing means publicly known in the art. Examples of the publicly known sexing means include a gene analysis method in which embryo and blood samples are collected from the hen eggs and sexing is performed with DNAs extracted from the collected samples by multiplex PCR with sex specific primers, and a method in which collected samples are analyzed with an instrument and sexing is performed based on the concentration of a component in the samples (e.g., the concentration of a hormone).

The above exemplary sexing means may be implemented by cracking the used hen eggs and collecting the samples after the standard visible and near-infrared spectra is obtained. Then, the principal component analysis is performed on the groups of standard spectrum data on the males and females. It is preferable to detect outliers in standard principle component spaces for the males and the females by using the Mahalanobis distance and obtain principle component score plots excluding the outliers. The obtained principle component score plots can be used as a sexing model.

Thereafter, the light irradiation step, the light detection step, and the spectrum obtaining step are performed on a measurement target hen egg to obtain its visible and near-infrared spectra. The visible and near-infrared spectra is preferably the second-order derivative spectrum. The principal component analysis is performed on the spectrum data of the obtained visible and near-infrared spectra, and the resulting principle component score is applied to the principle component space of the sexing model to determine the sex.

In this case, examples of the means for applying the principle component score of the measurement target hen egg to the principle component space of the sexing model include a residual variance method with the principle component space, a maximum distance method with wavelength, and the Mahalanobis distance in the principle component space.

The creation of the sexing model by the multivariate analysis and the sexing of the measurement target in this step may be performed by, for example, using a data analysis apparatus such as a computer that a commercially-available multivariate analysis software generally used in the art is installed, or by using a data analysis apparatus such as a computer coupled to the visible and near-infrared spectrometer used in the spectrum obtaining step. The data analysis apparatus coupled to the visible and near-infrared spectrometer usually stores a program for executing the spectrum data multivariate analysis. Thus, the sexing can be performed at a lower cost by performing this step with the data analysis apparatus coupled to the visible and near-infrared spectrometer.

In this step, the sexing model may be created by a multivariate analysis each time this step is performed. Nonetheless, it is preferable to store the data of the sexing model created in advance in the storage 101 of the sexing apparatus 100, and call and use the model when performing this step on the measurement target hen egg. In the case of the present embodiment, it is possible to shorten the sexing time.

It has been found that sexing can be performed highly precisely by performing the sexing based on spectrum data in the wavelength range of 1700 to 2500 nm in this step. The wavelength range of the spectrum data used in this step is a range of 1700 to 2500 nm, preferably a range of 1700 to 2200 nm or a range of 1800 to 2500 nm, and more preferably a range of 1800 to 2200 nm.

The spectrum data used in this step may be spectrum data of light continuously having all wavelengths in the above wavelength range(s), or spectrum data of light having some of the wavelengths in the above wavelength range(s) (e.g., particular wavelengths).

The wavelength range belongs to the range of the near-infrared light on the long wavelength side. From the spectrum data in the wavelength range on the long wavelength side, it is possible to obtain information on various components including proteins, fats, and so on contained in the eggshell and the hen egg. It is considered that male and female hen eggs slightly differ in the composition of various components contained inside the hen egg, in particular, inside the animal pole or the embryo in the yolk. Thus, by performing this step based on the spectrum data in the range of the near-infrared light on the long wavelength side mentioned above, it is possible to perform highly precise sexing based on the slight difference in the composition of the various components contained inside the eggshell and the hen egg.

Next, processing by the model creation engine 1011 in the sexing apparatus 100 will be described based on the flow in FIG. 8B. In this case, the sexing apparatus 100 associates the sexing result obtained in s5 in the flow in FIG. 8A described above (a highly precise sexing result obtained by another algorithm) with the image data of the hen egg 1 obtained in s3 and s4 as a label (s10).

Subsequently, the sexing apparatus 100 performs appropriate processing on the image data labeled in s10, for example, deleting unnecessary data and highlighting characteristic data, to create training data (s11). Note that the sexing apparatus 100 stores the created training data in the training data DB 1013.

In addition, the sexing apparatus 100 gives the training data obtained in s11 to the model creation engine 1011 to progress the machine learning, thereby creating the sexing model 1012 (s12), and terminates the processing. Note that the sexing apparatus 100 stores and holds the sexing model 1012 thus created in the storage 101.

Example Flow: Sexing

Figure 8B:
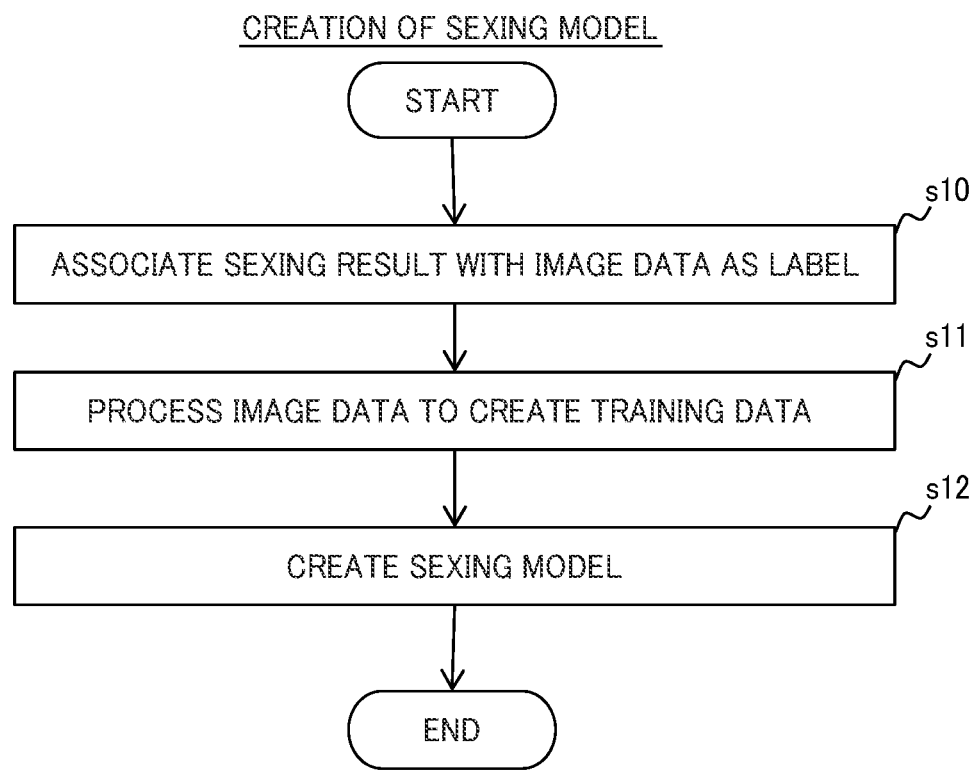
FIG. 8B is a diagram illustrating an example flow of the sexing method in the present embodiment.

The above-described processing in the flow illustrated in FIGS. 8A and FIG. 8B is intended to be performed on a large number of hen eggs that are sexed within 6 days from the start of the incubation to generate the sexing model 1012. Now, a flow utilizing such a sexing model 1012 to perform precise sexing on hen eggs 1 at an early stage after the start of incubation will be described based on FIGS. 9 to 11.

Here, the sexing apparatus 100 executes this flow on each hen egg 1 on the incubation tray 2 for all days for imaging (i.e., a total of 6 days from the start of the incubation until the sixth day).

For each hen egg on the incubation tray 2, the sexing apparatus 100, for example, detects whether a preset number of days from incubation, such as 2 days or 3 days, have passed since the start of the incubation by, for example, obtaining information on the number of days from incubation from an incubation management system or the like (s30).

Subsequently, the sexing apparatus 100 sends an instruction to collect the imaging data of the images of the hen eggs to the visible light camera 12 (the imaging/data collection methods 1 to n) (s31). In response to receiving this, the visible light camera 12 images the hen egg 1 by each method (s32) to obtain the image data.

Moreover, the sexing apparatus 100 obtains the image data of the hen egg 1 from the above-mentioned visible light camera (s33). In this case, it is conceivable to perform an operation in which, for example, a management system of the visible light camera 12 transmits the image data to the sexing apparatus 100 through the network 5.

Subsequently, the sexing apparatus 100 refers to the setting value in the determination method setting parameter 1016 and determines the sexing algorithm (s34).

If the result of the above determination indicates that the algorithm to be used is "instantaneous determination" (s34: YES), the sexing apparatus 100 executes the series of instantaneous determination processes illustrated in the flow of FIG. 10 (s35).

In this case, based on the preset values in the imaging/data collection method and the day columns in the threshold parameter 1015 illustrated in FIG. 5, the sexing apparatus 100 inputs the image data of the hen egg 1 at the corresponding number of days from incubation captured by the corresponding visible light camera 12 into the sexing model 1012 and executes sexing (s351, s354, . . . , s357).

If the result of the sexing indicates that the sex of the hen egg 1 is female (determining as "FEMALE" in s352, s355, . . . , s358), the sexing apparatus 100 stores the sexing result of the hen egg 1 on that day in the corresponding column in the determination result DB 1014, and terminates the processing.

On the other hand, if the result of the above sexing indicates that the sex of the hen egg 1 is male (determining as "MALE" in s352, s355, . . . , s358), the sexing apparatus 100 performs sexing with the sexing model 1012 in the same way on the image data obtained on the next day or by the next imaging/data collection method. If such a series of sexing operations ends up with a determination result indicating "MALE" on any day, the hen egg 1 is marked as a non-incubation target or discharged from the incubation tray 2, and the processing is terminated.

Figure 9:
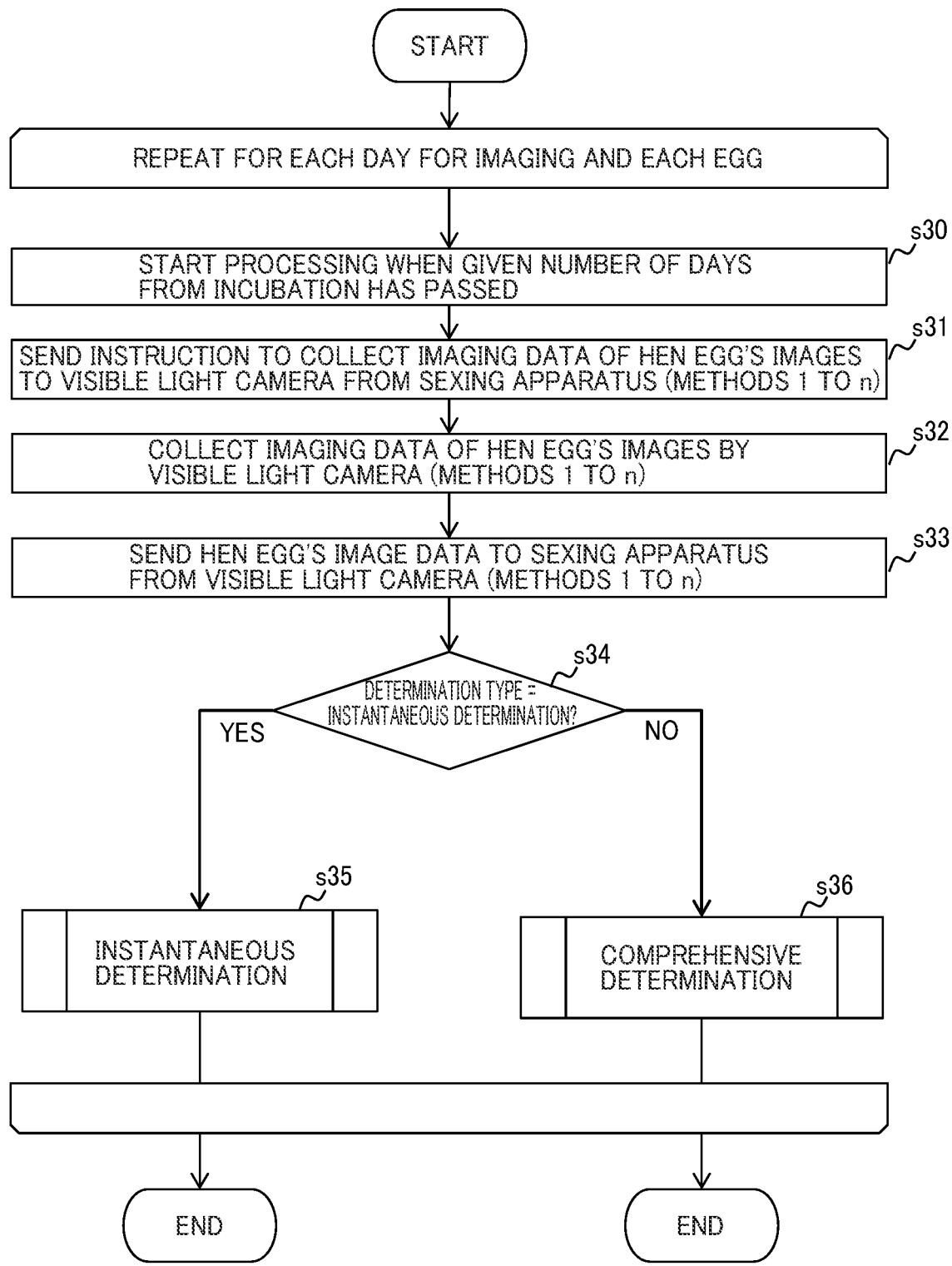
FIG. 9 is a diagram illustrating an example flow of the sexing method in the present embodiment.

The description now returns to the flow of FIG. 9. If, on the other hand, the result of the determination in s34 described above indicates that the algorithm to be used is "comprehensive determination" (s34: NO), the sexing apparatus 100 executes the series of instantaneous comprehensive processes illustrated in the flow of FIG. 11 (s36).

Figure 10:
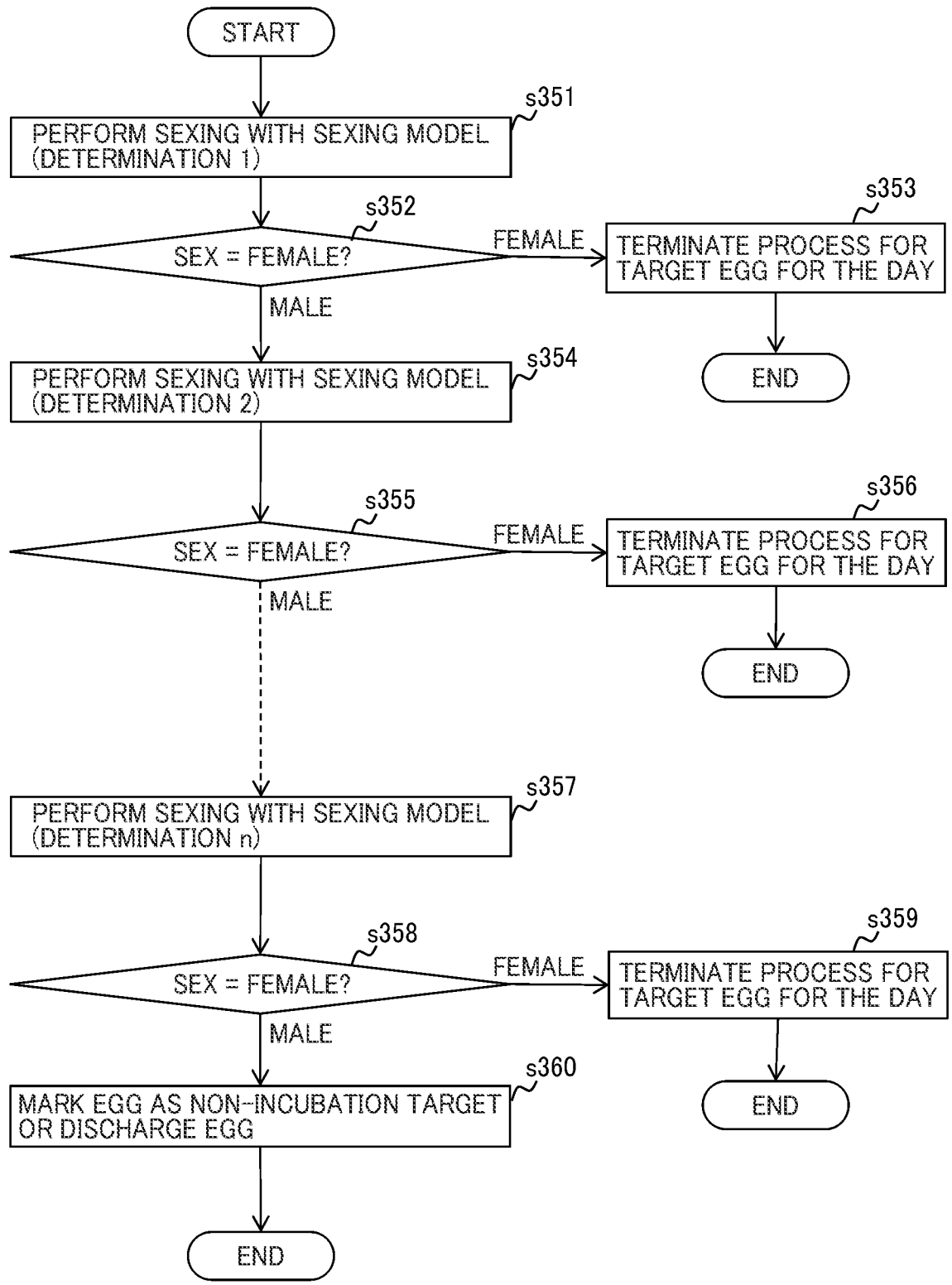
FIG. 10 is a diagram illustrating an example flow of the sexing method in the present embodiment.
Figure 11:
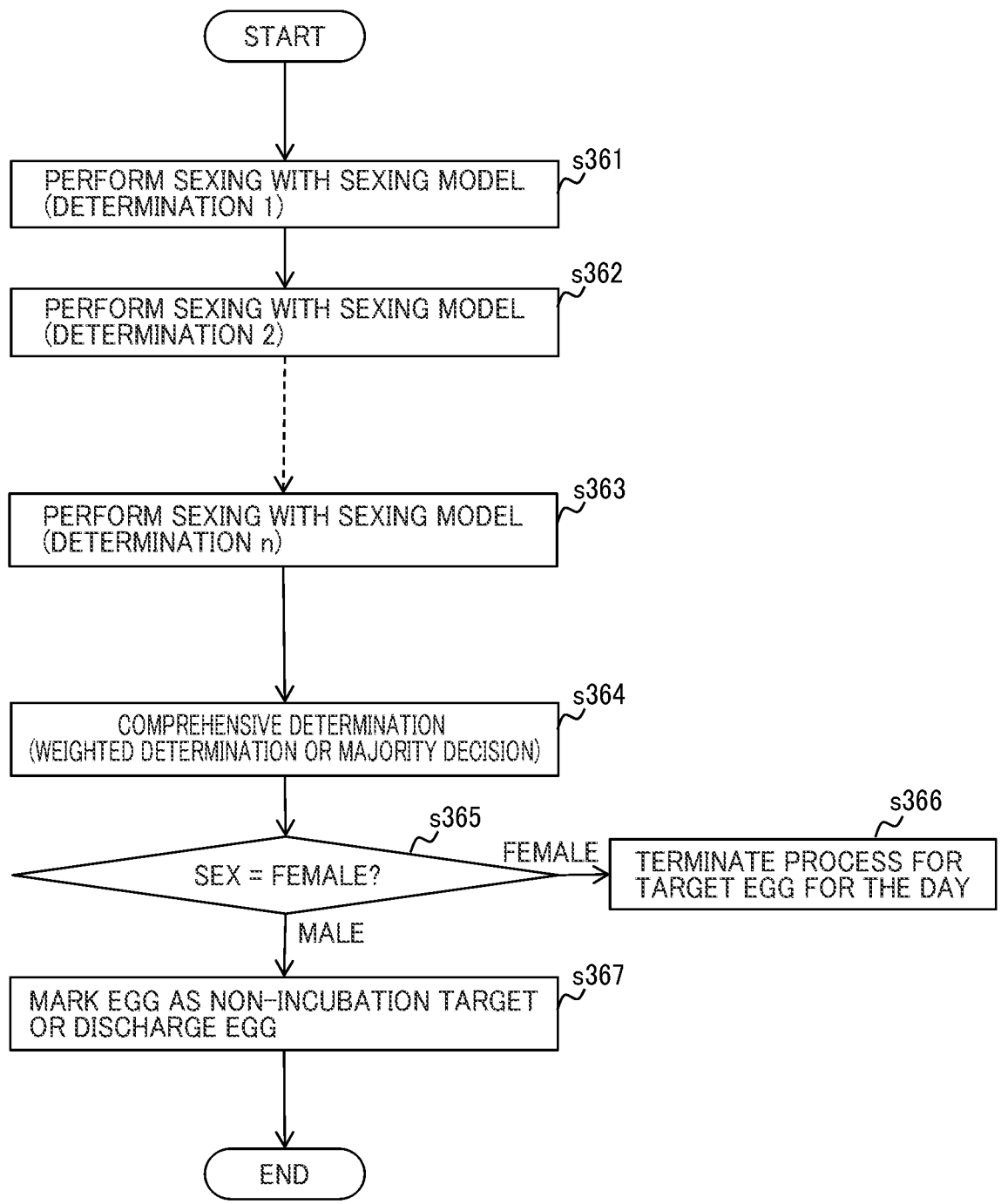
FIG. 11 is a diagram illustrating an example flow of the sexing method in the present embodiment.

In this case, the sexing apparatus 100 inputs the image data obtained on each day by each imaging/data collection method as mentioned in the flow of FIG. 10 into the sexing model 1012 and obtain a sexing result (s361 to s363).

Moreover, with the sexing results obtained up to s363, the sexing apparatus 100 executes the comprehensive determination process based on the preset "female determination threshold value" and "weight" in the threshold parameter 1015 in FIG. 5 (s364). This process involves a process of performing sexing, for example, on the image data on the third day based on whether or not the likelihood of being female is 90% or higher and multiplying that sexing result (e.g., "1" for female and "0" for male) by the weight value. Such a process is executed, for example, on each of the pieces of image data obtained on the days that have passed so far. If, for example, the average of the products derived for the above days is a predetermined threshold value or more (or is more than a predetermined threshold value), the sex of the hen egg 1 is determined to be female (s365: FEMALE), and the processing is terminated.

On the other hand, if the result of the above determination indicates that the average is the predetermined threshold value or less (or is less than a predetermined threshold value), the sex of the hen egg 1 is determined to be male (s365: MALE), the hen egg 1 is marked as a non-incubation target or discharged from the incubation tray 2 (s367), and the processing is terminated.

The best mode for carrying out the present invention and the like have been specifically described above. However, the present invention is not limited to this, and various changes can be made without departing from the gist thereof.

In accordance with the present embodiment as above, it is possible to perform sexing before the seventh day of incubation, which is assumed to be the day on which the embryo in the hen egg acquires a sense of pain. Thus, it is possible to remove eggs that are likely to be male at an early stage before hatching (without causing a sense of pain) and therefore substantially avoid culling male chicks.

Moreover, it is possible to precisely select and incubate eggs that are likely to be female, and therefore reduce the incubation costs and improve the efficiency of production of layers.

Furthermore, it is possible to solve problems in the egg production industry such as the shortage of sexers, the animal welfare addressing the cull of male chicks, and the reduction of the costs for the egg incubation and cull.

From what has been set forth in this description, at least the following will be clear. Specifically, in the sexing apparatus in the present embodiment, the above irradiation means may be configured to apply light having a wavelength in the range of a visible light and near-infrared light, and the above imaging means may be a visible light camera.

In this way, it is possible to implement a simple operation at a low cost with a visible light camera, which is general imaging means. Furthermore, it is possible to perform highly precise non-destructive sexing at a low cost at an early stage of incubation.

In addition, the sexing apparatus in the present embodiment may further comprise: light detection means configured to detect the light applied by the irradiation means which is transmitted through a hen egg or reflected inside the hen egg and emitted to an outside of the hen egg; spectrum obtaining means configured to obtain a visible and near-infrared spectra of the light detected by the light detection means; and sexing means configured to sex the hen egg based on spectrum data in a wavelength range of 1700 to 2500 nm in the visible and near-infrared spectra obtained by the spectrum obtaining means, and a result of the sexing by the sexing means may be used as the result of the sexing in advance. This makes it possible to make a highly precise sexing model, and furthermore perform more accurate non-destructive sexing at an early stage of incubation.

Moreover, in the sexing method in the present embodiment, the above irradiation step may involve applying light having a wavelength in the range of the visible light and near-infrared light, and the above imaging step may involve performing the image with a visible light camera.

In addition, the sexing method in the present embodiment may further comprise: a light detection step of detecting the light applied in the irradiation step which is transmitted through a hen egg or reflected inside the hen egg and emitted to an outside of the hen egg; a spectrum obtaining step of obtaining a visible and near-infrared spectra of the light detected in the light detection step; and a sexing step of sexing the hen egg based on spectrum data in a wavelength range of 1700 to 2500 nm in the visible and near-infrared spectra obtained in the spectrum obtaining step, and a result of the sexing in the sexing step may be used as the result of the sexing in advance.

REFERENCE SIGNS LIST 1 hen egg
2 incubation tray
5 network
10 sexing system
11 light source (irradiation means)
12 visible light camera (imaging means)
100 sexing apparatus
101 storage
1011 model creation engine
1012 sexing model
1013 training data DB
1014 determination result DB
1015 threshold parameter
1016 determination method setting parameter
102 program
103 memory
104 CPU
105 communication device
150 terminal
200 image collection server
201 storage
2011 captured image DB
202 program
203 memory
204 CPU
205 communication device

The invention claimed is:

1. A sexing apparatus comprising:
an irradiation means for irradiating one or more hen eggs within a predetermined period of time from a start of an incubation with light having a predetermined wavelength, wherein the irradiation means comprises a first light source and a second light source, and wherein the light comprises a wavelength in a visible light from the first light source and a wavelength in a near-infrared light range from the second light source;
an imaging means for imaging the one or more hen eggs during irradiation to generate image data;
a means for generating a sexing model using, as training data, a result of separately sexing the one or more hen eggs and the image data, wherein the sexing model comprises threshold parameters, wherein each of the threshold parameters is configurable, and wherein the threshold parameters comprise a collection method, a day, a female determination threshold, and a weight; and
a means for sexing a target hen egg by:
respectively setting a first value and a second value for the day and the female determination threshold of the threshold parameters, wherein the sexing model utilizes the day of the threshold parameters to perform the sexing of the target hen egg at or less than three days as the predetermined time from the start of the incubation;
receiving target hen image data from a subsequent irradiation by the irradiation means and a subsequent imaging by the imaging means of the target hen egg, and
inputting into the sexing model the target hen egg image data to generate a sex of the target hen egg.

2. The sexing apparatus according to claim 1, wherein the imaging means is a visible light camera.

3. The sexing apparatus according to claim 1, further comprising:
light detection means for detecting emitted light comprising light emitted to an outside of the target hen egg when the light irradiated by the irradiation means has been transmitted or reflected through the target hen egg;
spectrum-obtaining means for obtaining a visible and near-infrared spectra of the emitted light,
wherein the means for sexing generates the sex of the target hen egg based on spectrum data in a wavelength range of 1700 to 2500 nm in the visible and near-infrared light ranges.

4. The sexing apparatus according to claim 1, wherein the means for sexing generates the result of separately sexing the one or more hen eggs by using the image data and the emitted light for each of the one or more hen eggs.

5. The sexing apparatus according to claim 1, wherein the second light source comprises a halogen lamp or a ceramic device.

6. A sexing method comprising:
irradiating, by a first light source and a second light source, one or more hen eggs within a predetermined period of time from a start of an incubation with light having a predetermined wavelength, the light comprising a wavelength in a visible light from the first light source and a wavelength in a near-infrared light range from the second light source;
imaging the one or more hen eggs during irradiation to generate image data;
generating a sexing model using, as training data, a result of separately sexing the one or more hen eggs and the image data, wherein the sexing model comprises threshold parameters, wherein each of the threshold parameters is configurable, and wherein the threshold parameters comprise a collection method, a day, a female determination threshold, and a weight; and
sexing a target hen egg by:
respectively setting a first value and a second value for the day and the female determination threshold of the threshold parameters, wherein the sexing model utilizes the day of the threshold parameters to perform the sexing of the target hen egg at or less than three days as the predetermined time from the start of the incubation;
receiving target hen image data from a subsequent irradiation and a subsequent imaging of the target hen egg, and
inputting into the sexing model the target hen egg image data to generate a sex of the target hen egg.

7. The sexing method according to claim 6, wherein a visible light camera images the one or more hen eggs and generates the image data.

8. The sexing method according to claim 6, further comprising:
   detecting emitted light comprising light emitted to an outside of the target hen egg when the light irradiated by the first and second light sources has been transmitted or reflected through the target hen egg;
   obtaining a visible and near-infrared spectra of the emitted light,
   wherein the sex of the target hen egg is based on spectrum data in a wavelength range of 1700 to 2500 nm in the visible and near-infrared light ranges.

9. The sexing method according to claim 6, wherein the result of separately sexing the one or more hen eggs is generated by using the image data and the emitted light for each of the one or more hen eggs.

10. The sexing method according to claim 6, wherein the second light source comprises a halogen lamp or a ceramic device.

11. The sexing apparatus according to claim 1, wherein the inputting into the sexing model of the target hen egg image data to generate the sex of the target hen egg is based on whether a certainty factor of the sexing model is equal to or more than the female determination threshold.

12. The sexing apparatus according to claim 1, wherein the means for sexing the target hen egg comprises respectively setting the first value, the second value, the third value, and the fourth value for the day, the female determination threshold, the collection method, and the weight of the threshold parameters.

13. The sexing apparatus according to claim 12, wherein the sexing model sets the weight to a first percentage when the first value is three days or less and to a second percentage when the first value is four to six days.

14. The sexing apparatus according to claim 13, wherein the first percentage is lower than the second percentage.

15. The sexing apparatus according to claim 1, wherein the threshold parameters identify a plurality of patterns, each of the plurality of patterns represent the collection method and the day for imaging for the target hen egg and specify values for the female determination threshold and the weight.

16. The sexing apparatus according to claim 1, further comprising:
   a light detection means comprising a light detection element comprising silicon, PbS (lead sulfide), InGaAs (Indium gallium arsenide), or arsenides,
   wherein the light detection means is for detecting emitted light comprising light emitted to an outside of the target hen egg when the light irradiated by the irradiation means has been transmitted or reflected through the target hen egg.

* * * * *